United States Patent

[11] 3,588,507

| [72] | Inventors | Jacques J. Weinstock<br>Flushing;<br>William D. Hay, Peekskill, N.Y. |
|---|---|---|
| [21] | Appl. No. | 723,646 |
| [22] | Filed | Apr. 1, 1968 |
| [45] | Patented | June 28, 1971 |
| [73] | Assignee | Unit Process Assemblies, Inc.<br>Woodside, N.Y.<br>Continuation-in-part of application Ser. No. 642,630, May 9, 1967, now abandoned. |

[54] BETA BACKSCATTER THICKNESS MEASURING APPARATUS FOR APERTURES IN PRINTED CIRCUIT BOARDS AND THE LIKE
22 Claims, 12 Drawing Figs.

[52] U.S. Cl. .................................................. 250/83.3, 250/83.6; 105
[51] Int. Cl. ........................................................ G01t 1/16
[50] Field of Search............................................ 250/83.3 (D), 83.6, 105

[56] References Cited
UNITED STATES PATENTS

| 3,223,840 | 12/1965 | Varner | 250/83.3D |
| 3,376,419 | 4/1968 | Schumacher | 250/83.3D |
| 3,421,000 | 1/1969 | Lieber et al. | 250/83.3DX |
| 3,439,166 | 4/1969 | Chope | 250/83.3D |

*Primary Examiner*— Archie R. Borchelt
*Attorneys*— Albert C. Johnston, Robert E. Isner, Lewis H. Eslinger and Alvin Sinderbrand ABSTRACT: Apparatus for locating a beta ray emitting probe assembly and an aperture in a printed circuit board or other workpiece at a measuring station in precise relationship to one another to effect beta backscatter-type measurements of the thicknesses of platings on a predetermined area on the sidewall of a selected aperture, including means for guiding the probe assembly for movement between a retracted position and an advanced operative measuring position to assure directed impingement of a collimated beam of beta radiation on said predetermined area of the wall of any aperture selected from a plurality of similar apertures in a board.

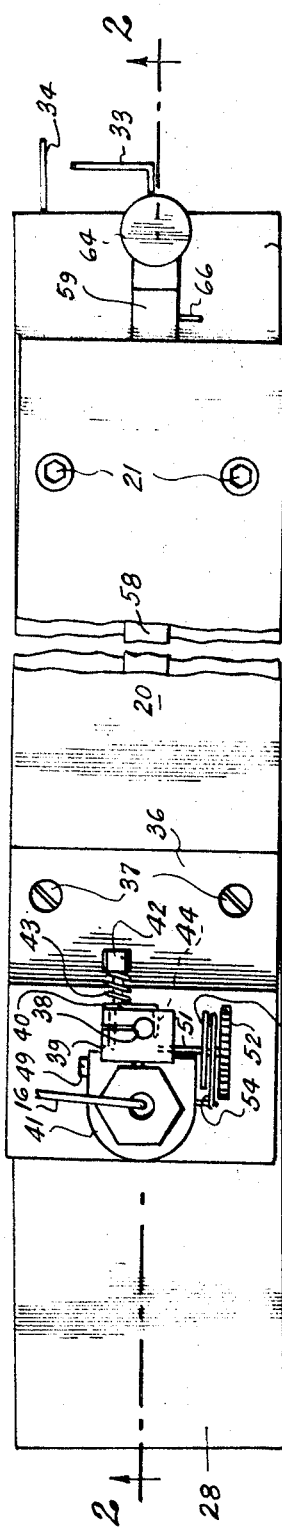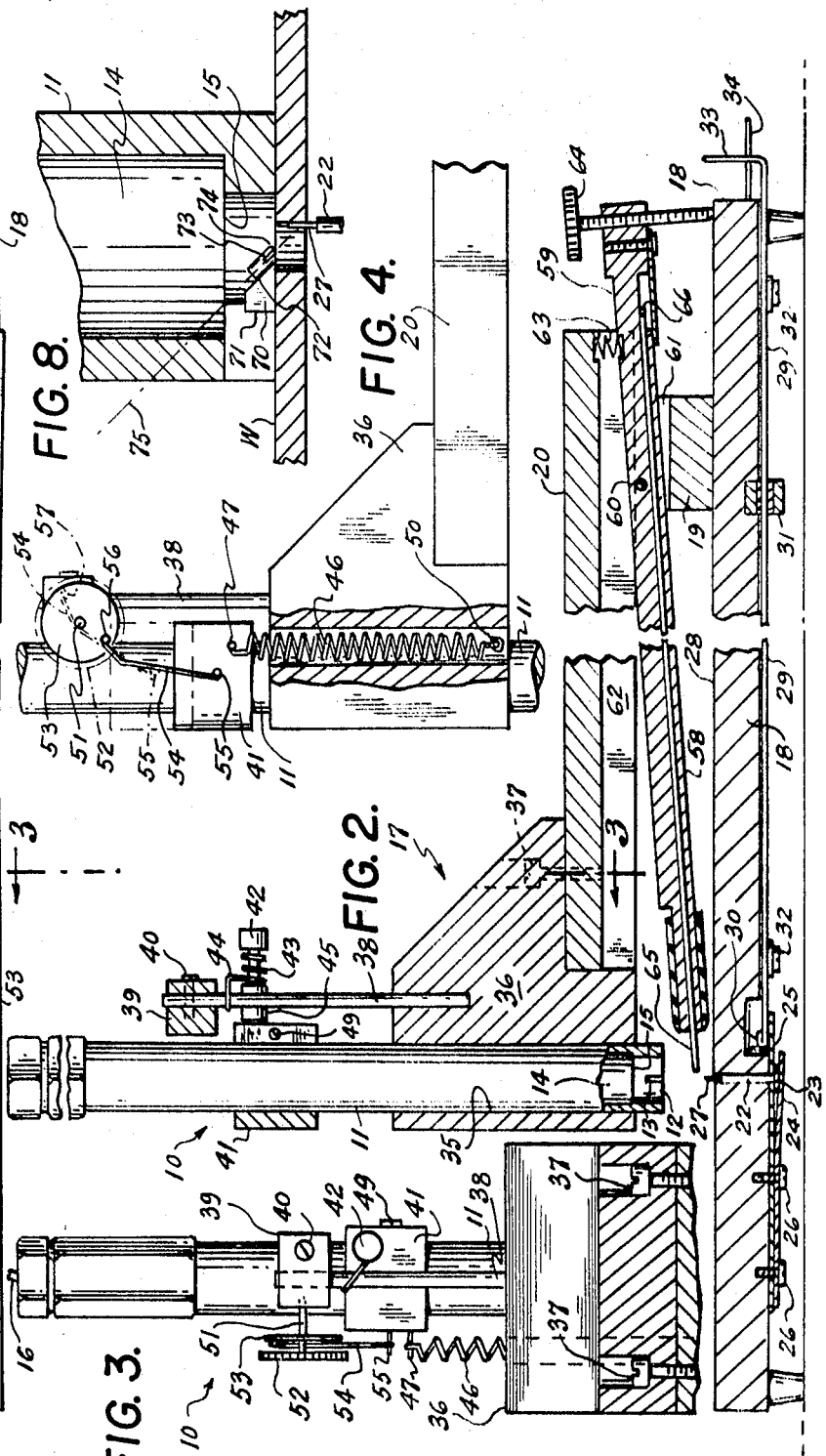

PATENTED JUN 28 1971 3,588,507

INVENTORS
JACQUES J. WEINSTOCK
WILLIAM D. HAY

BY
ATTORNEY

PATENTED JUN 28 1971   3,588,507

INVENTORS
JACQUES J. WEINSTOCK
WILLIAM D. HAY
BY
*Robert E. Isner*
ATTORNEY 3,588,507

BETA BACKSCATTER THICKNESS MEASURING APPARATUS FOR APERTURES IN PRINTED CIRCUIT BOARDS AND THE LIKE

This application is a continuation-in-part of application Ser. No. 642,630, filed May 9, 1967 and now abandoned.

This invention relates generally to instruments for measuring the thicknesses of coating materials by beta ray backscatter techniques, and more particularly to means for measuring the thickness of a thin plating or coating on the sidewall of an aperture in a workpiece.

Beta ray backscatter-type instruments have been extensively used to measure the thickness of metallic deposits and of coatings of various other materials. These instruments generally include a source of beta radiation, conveniently a radioactive isotope, means for directing the emitted radiation on to a workpiece, a radiation detector, conveniently a Geiger-Muller tube, positioned to receive radiation backscattered from the workpiece and an associated electronic counter or readout unit which converts the output of the detector into utilizable intelligence. The accuracy and sensitivity of beta ray backscatter-type instruments is largely dependent upon the geometry of the system, that is, the geometric or positional relationship between the source, workpiece and detector, and to this end auxiliary means for locating the workpiece relative to the source and detector are usually incorporated, in accordance with the dictates of the workpiece configuration, as a component of most such measuring systems.

Although beta backscatter-type instruments are experiencing continually wider use for the measurement of coatings or the like on readily accessible surfaces, the aforementioned "-geometry" requirements have effectively impeded their utilization in the measurement of coatings and the like on inaccessible locations on workpieces. A particular problem of long standing has been the measuring of the thickness of a coating on the sidewall of a relatively small hole or aperture in a workpiece. The most common instance thereof is probably the apertures in printed circuit boards for the electronic industry. Commonly used printed circuit boards, for example, are composed of a laminated phenolic or epoxy-fibre glass having a thickness of about one-sixteenth inch. The diameters of apertures in the boards are generally of an order ranging from about 0.030 inch to 0.100 inch. The metallic plating on the sidewalls of these apertures is necessarily very thin and it is essential in the interest of economy and for attaining efficient and reliable operational conditions of a printed circuit board that the thickness of the plating on the walls of all of the apertures conform to acceptable specifications.

In accordance with the present invention, an apparatus is provided for mounting a beta backscatter-type probe assembly in a predetermined position relative to a measuring "station" at which means are provided to locate precisely the sidewall of an aperture whose coating thickness is to be measured in a position to selectively receive emitted beta radiation from the probe assembly and to permit the backscatter therefrom to impinge on a detector. The apparatus also includes means for permitting withdrawal and advance of the probe assembly along a predetermined path fixedly disposed in relation to the measuring station.

The primary object of this invention is the provision of a beta backscatter-type measuring apparatus adapted to measure the thickness of thin coatings on relatively inaccessible locations, as, for example, the sidewalls of apertures in printed circuit boards.

Another object of the invention is the provision of apparatus to selectively direct emitted beta radiation on to the sidewalls of an aperture whose coating thickness is to be measured and to selectively lo.. . detector relative thereto to receive the backscattered .n therefrom.

Another object is to provide means for releasably holding a probe assembly in a retracted position from which it is easily releasable to permit it to move in a predetermined path toward the surface of a workpiece or printed circuit board.

Another object is to provide means engageable with a workpiece, such as a printed circuit board, for holding the workpiece in fixed relation to the predetermined path of movement of a probe assembly for assuring that an aperture selected for measuring is maintained fixed in a precise position at the measuring station.

Another object of the invention is to provide means for identifying the particular aperture in a printed circuit board which has been selected and positioned for measurement.

Still another object is to ensure the accuracy and reproducibility of thickness measurements with a beta backscatter-type measuring apparatus by masking the Geiger-Muller tube or other radiation detector of the probe from the forward scattered radiation, that is, the radiation that passes through the coating being measured and then is directed toward the detector.

Still another object is to provide an apparatus of the described character with which the steps required for the accurate measurement of coating thicknesses can be easily effected, even by relatively unskilled personnel.

A further object is to provide a beta backscatter-type measuring apparatus adapted to measure the thickness of thin coatings at inaccessible locations on a workpiece, as above, and wherein a single manually actuable control is actuated in a step-by-step manner to successively condition the apparatus for the rough positioning of the coating to be measured at the measuring station, for accurately locating such coating relative to the probe, and then for clamping the workpiece at the accurately determined location and disposing the probe at its position for measuring the coating thickness.

A still further object is to provide an apparatus of the described character in which the accurate location of the coating to be measured relative to the probe is effected by a locating pin engaged against the coating surface, and such locating pin is withdrawn from the coating surface prior to the thickness measurement in a manner to avoid marring or damage to the coating.

The above, and other objects, features and advantages of this invention, will be apparent in the following detailed description of illustrative embodiments thereof which is to be read in connection with the accompanying drawings, wherein:

FIG. 1 is a top view of an apparatus according to one embodiment of the present invention;

FIG. 2 is a vertical section on line 2–2 of FIG. 1 and showing the lower end of a probe assembly broken away;

FIG. 3 is a vertical cross-sectional view on line 3–3 of FIG. 2;

FIG. 4 is a fragmentary elevational view showing the probe assembly lowered to operative position, and a manipulative device for raising the probe assembly;

FIG. 8 is an enlarged vertical sectional view of one construction for the mounting of the source at the end of the probe assembly;

Figure 5:
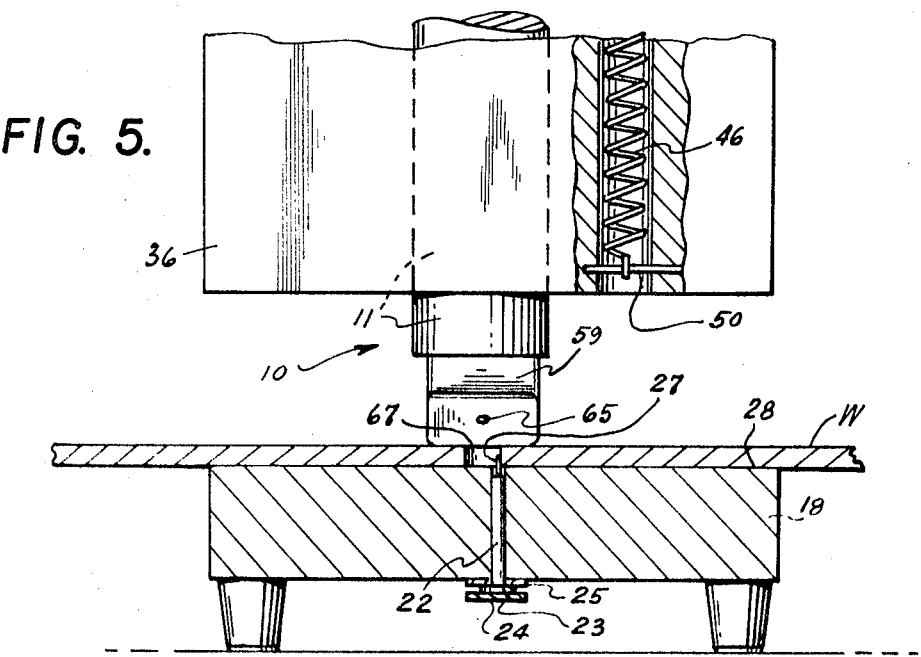
FIG. 5 is an enlarged vertical view showing a section through a measuring station determined by the point of contact of a displaceable locating pin with the sidewall of an aperture in a printed circuit board.
Figure 6:
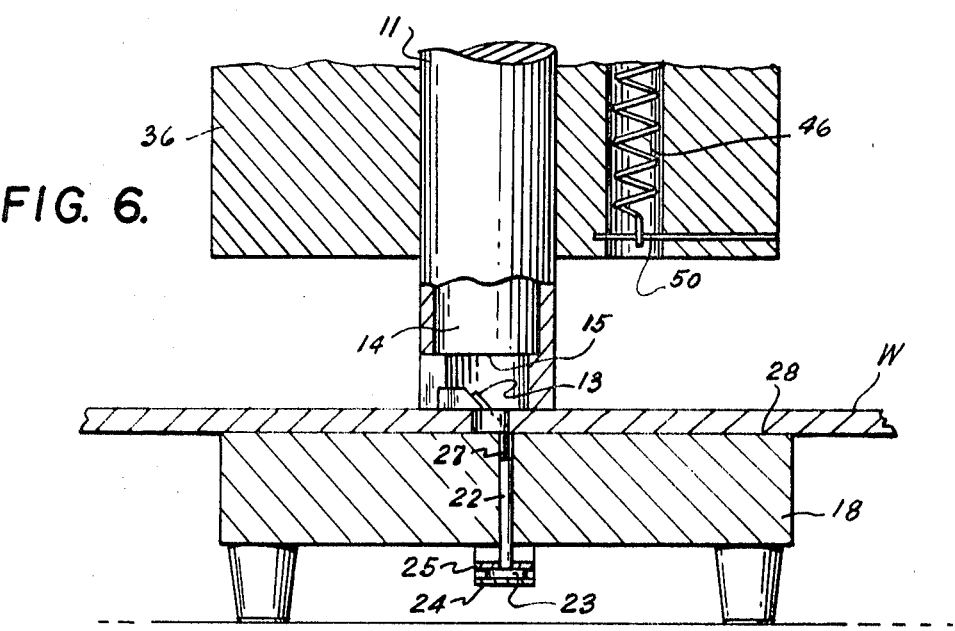
FIG. 6 is a view similar to FIG. 5 but showing the locating pin withdrawn from the aperture in the printed circuit board and the probe assembly in operative position to measure the thickness of the coating at the inside of the aperture.
Figure 7:
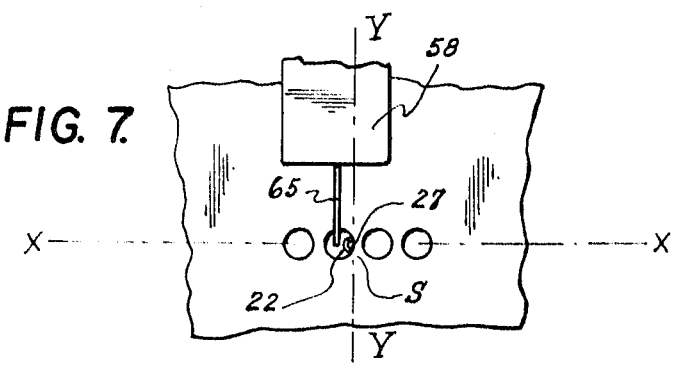
FIG. 7 is a diagrammatic plan view of the measurement station at the aperture-locating pin.

Referring first to FIGS. 1—8 of the drawings, there is shown a portable probe assembly 10 including an elongated hollow member or casing 11 having an exposure opening 12 at one end (FIGS. 2 and 6). Mounted within the exposure opening 12 is a beta ray emitting radioactive isotope source contained in a relatively small holder or cup 13 and a beta radiation detector 14, suitably a Geiger-Muller tube, disposed above cup or holder 13 and having its window 15 arranged in fixed relation to the holder 13 and to the opening 12 of the casing. As is conventional, the output of the detector 14 is transmitted through a cable 16 to a readout or scaler unit (not shown) for conversion to utilizable intelligence.

As illustrated, the plane of the exposure opening 12 is perpendicular to the longitudinal axis of the probe assembly and the source holder or cup 13 is so located and supported as to direct a beam of radiation in the nature of an expanding cone at a selected angle with respect to both the plane of the opening 12 and the longitudinal axis of the casing 11. Additionally, the source holder 13 is so constituted as to shield the window 15 of the detector and together with its mounting element 9 is of diminutive size so as to minimize interference with the backscatter from the workpiece.

The portable probe assembly 10 is mounted on and supported by a jig assembly 17 in a manner to enable it to be moved in a predetermined path toward and away from a workpiece W (FIGS. 5 and 6) laying on the base 18 of the instrument.

As shown in FIGS. 1 and 2, the base 18 is in the form of a rectangular slab to which a spacing block 19 and an overhanging arm 20 are securely attached in fixed relationship thereto by a pair of bolts 21. The arm 20 extends from the block in spaced relation to the base 18 to terminally overlie a measurement station location as defined or established at least in part by a pin 22 which is displaceable axially in a close-fitting guide bore in the base 18. The function of the pin is to locate an aperture in a workpiece in precise position relative to the probe assembly as explained more fully hereinafter.

A dependent head 23 on the pin 22 is engaged at opposite sides by flat springs 24 and 25 which are fastened to the underside of the base 18 by screws 26. Spring 24 biases the pin upwardly and spring 25 is adapted to be actuated to depressingly flex the spring 24 and to retract the upper end 27 of the pin 22 to below the table surface 28 of the base 18 as illustrated in FIG. 6.

The springs may be flexed away from the underside of the base 18 to retract the pin 22 by rotation of a rod 29 to turn a protuberance 30 on the terminal end thereof into depressive contact with the spring 25.

The rod 29 is mounted in a bearing 31 and held in a groove in the underside of the base 18 by the bearing and the heads of screws 32. The free end of the rod extends beyond the base 18 and is bent at an angle thereto to form an easily manipulatable handle 33 for facilitating rotation of the rod. A fixed stop 34 for the handle establishes the limit of turn of the rod 29 at which the pin 22 is retracted from the raised position thereof shown in FIGS. 2 and 5.

The probe assembly 10 is mounted to slide axially in a bore 35 in a guide body 36 which abuts the terminal end of the arm 20 and is securely fixed thereto by screws 37 to maintain the bore 35 truly perpendicular to the table surface 28. The guide body 36 may consist of synthetic resin, metal or of any other suitable material.

The rotation of the probe assembly in the bore 35 is prevented by means including an upright bar 38 staked solidly in the guide body 36 parallel to the bore 35 and a slotted clamping member 39 secured to the bar 38 by a tightened screw 40. The bar 38 and the clamping member 39 also support a device for manually retracting the probe assembly from an operative position, FIGS. 4 and 6, to an elevated position as shown in FIGS. 2, 3 and 5 and for holding the probe assembly in the latter position until manually released. This manipulative device will be described more fully hereinafter.

The probe assembly 10 is firmly engaged by a clamping collar 41 to which a pin 42 is mounted. One end of a torsion spring 43 on the pin 42 is secured to the pin, and its other end is bent to provide a laterally extending portion 44 which bears on the side of bar 38 opposite from the side thereof along which the pin extends. The torsion spring 43 presses an antifriction roller 45 on the pin 42 against the bar 38 and thus holds the collar 41 and the probe assembly stable against rotary movement about the axis of the bore 35 without interfering with the lineal translation of the probe assembly in the bore.

As will now be apparent one advantage of this arrangement lies in the fact that it provides means which enables the use of a portable pencil-type probe assembly having a cylindrical casing. Stabilization against rotation can also be accomplished by providing a probe assembly with a casing having a polygonal exterior surface and a suitable guide with a matching bore.

It is essential that the operative end of the prove assembly be pressed firmly against a workpiece during a measuring operation. This is accomplished by a spring 46 engaged at one end to a pin 47 anchored in the clamping collar 41 surrounding the casing 11 of the probe assembly and secured thereto by a tightened screw 49. The spring extends through a bore in the guide body 36 to a pin 50, FIG. 6, in the latter member to which its lower end is attached.

While the probe assembly can be retracted manually from a lowered operative position simply by grasping and raising the probe assembly against the action of the spring 46, mechanical means are provided for holding the probe assembly in a raised position so that an operator's hands are freed to handle a workpiece. Manipulative means for raising, holding and releasing the probe assembly from an elevated position are accordingly provided. To this end a device is provided including a rotatable stem 51 having a knurled head 52 and a disc 53 spaced therefrom. The stem is in threaded engagement with a hole in the member 39 which is clamped to the upright bar 38. The lower end of a wire 54 is connected to a pin 55 extending laterally from the collar 41 around the probe assembly and its upper end is connected to a crankpin 56 on the disc 53.

With this device the probe assembly may be lifted from a lowered position, as shown in FIG. 4, to an elevated position by rotating the knurled head 52 to raise the wire 54. Upon rotating the crankpin 56 to the position indicated at 57 the device will remain at rest and support the probe assembly in its raised position until the head 52 is rotated in the reverse direction.

For measuring the thickness of a coating at the inside of an aperture of a printed circuit board, the board is placed on the base 18 and the locating pin 22 is raised to extend into a selected aperture in the board. The board is then shifted edgewise, if necessary, to bring the side of the selected aperture into contact with the locating pin 22, as demonstrated in FIG. 5. As a consequence, the plating area of the wall of the aperture whose thickness is to be measured is precisely located at the measuring station S at the intersection of the coordinates X and Y, as graphically illustrated in FIG. 7.

The board is then clamped in place by the rubber-covered end of the arm 58 of a lever 59 which is pivotally mounted to rotate on a pivot pin 60 extending through the spacing block 19. The pivot pin extends across a slot 61 in the spacing block 19 which together with a slot 62 in the overhanging arm 20 provides space allowing for tilting of the lever. A spring 63 urges the arm 58 away from the base 18. The lever is positionable against the action of the spring to press the arm 58 onto a board W, FIG. 5, by an adjustable thumbscrew 64 in threaded engagement with the lever and bearing endwise against the base 18.

Since it may be difficult for an operator to determine which aperture of a considerable number of small apertures in close proximity to one another is positioned at the measuring station, means are provided for identifying the selected aperture immediately above the locating pin. The identifying means shown in FIGS. 2 and 7 consists of a straight rod 65 slidable in a bore in the lever 59. The rod has a handle 66 by which it can be moved endwise to indicate a selected aperture, or wholly retracted into the lever.

As shown in FIG. 5, a portion of the cylindrical surface of the reduced end of the locating pin 22 engages the side of an aperture 67 whose coating is to be measured. The lever 59 clamps and holds the workpiece W on the table surface 28. The indicating rod 65 points directly to the center of the selected aperture. The probe assembly 10 is shown in retracted position.

In FIG. 6, the locating pin 22 has been withdrawn from engagement with the workpiece and the probe assembly is shown over the measuring station where it is firmly pressed against the workpiece by the spring 46.

FIG. 8 illustrates one construction for the mounting of the radioactive source at the end of the probe housing 11. There is provided a thin source holder mounting arm 70 secured as at 71 to the casing 11 and extending radially inwardly therefrom. The free end of the arm 70 is disposed at an angle 72, suitably about 45°, and a source holder 13 is mounted thereon. The source holder 13 is generally of cylindrical shape having an axial isotope containing recess or bore 73 in the dependent end thereof and with the adjacent end portion preferably tapered as at 74 to form a generally conical configuration to minimize the interferences with backscatter. In order to minimize, if not eliminate, undesired backscatter from sample surfaces other than those being measured, the source holder 13 is located so as to have its dependent end disposed substantially coincident with the plane of the exposure opening 12 and concomitantly with the plane of the upper surface of the workpiece W. As illustrated, such is conveniently effected by mounting the source holder 13 so that when the dependent end is flush cut in the plane of the opening 12, the desired result is achieved.

In order to locate the point of impingement of the axis of the beta ray beam on the desired area on the side of the wall of the selected aperture, the position of the arm 20 relative to the base 18 has been heretofore described as having been fixedly set to locate the axis of the guide bore 35 and of the probe assembly to the left of the locating pin 22, as viewed in FIG. 6. The fixed horizontal angular relation between arm 20 and the base 18 is apparent from viewing FIG. 1. The length of the support arm 70 and the angular attitude of the terminal end are preselected in accord with the general dimensions of the workpiece area and of the probe casing so that the longitudinal axis of the cone of the beta radiation, as indicated by the dotted line 75, emitted from the source holder 13 is directed generally at the midpoint of the wall of the aperture 67 of the circuit board being measured, so that the radiation cone will thus cover a substantial part of the surface thereof.

As is apparent, in the arrangement of the component parts of the apparatus 10 as hereinabove described, the edgewise direction of movement of a circuit board to selectively engage the locating pin 22 against the aperture wall is lateral to the longitudinal direction of the base 18. It will now be apparent to those skilled in this art, that alternatively by setting the arm 20 with its longitudinal central axis parallel to the longitudinal central axis of the base 18 and placing the probe assembly in its collar 41 with the beta ray emitting source disposed to direct a beta ray beam in the plane of the longitudinal central axes, the board would then be moved in the direction of the longitudinal central axes rather than crosswise to engage the locating pin 22 in an aperture. Once the apparatus is assembled to perform its function, the thicknesses of coatings on any number of similar apertures may be measured without requiring adjustment of the cooperating parts between sequential measuring operations.

Figure 9:
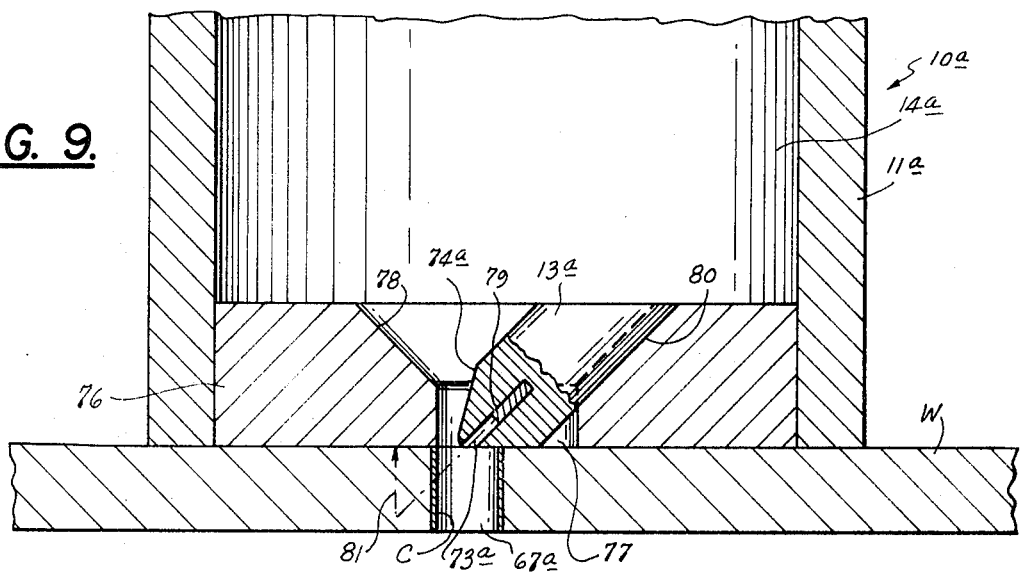
FIG. 9 is a view similar to that of FIG. 8, but showing a preferred arrangement at the lower end of the probe assembly.

Referring now to FIG. 9, it will be seen that, in a preferred probe assembly 10a for a thickness-measuring apparatus according to this invention, the elongated, cylindrical casing 11a has its lower end substantially closed by a relatively thick mask member 76 disposed below beta radiation detector 14a. The mask member 76 has an aperture 77 of relatively small diameter opening at its lower surface, and the upper portion of aperture 77 is countersunk, as at 78, to provide an opening of relatively large diameter at the upper surface of the mask member which is substantially coextensive with the window of radiation detector 14a.

In the probe assembly 10a, the source holder 13a is generally of cylindrical shape and has an axial bore 73a opening at the lower end of the holder and containing an isotope source 79 which is preferably recessed in the bore, as shown, to provide a collimated beam of radiation. The lower end portion 74a of holder 13a is tapered or conical, as shown, to minimize interference of holder 13a with backscatter. The holder 13a is mounted in a recess 80 formed in countersink 78 so as to have its longitudinal axis at an angle, suitably about 45°, to the longitudinal axis of casing 11a, and the lower end of holder 13a is cut flush with the lower surface of mask member 76 which closely engages the upper surface of a workpiece W during measurement of the thickness of a coating C on the side surface of a selected aperture 67a of the workpiece.

By reason of the mask member 76 defining a relatively small aperture 77 at its lower surface, the radiation detector 14a is shielded from forward scatter, that is, radiation from source 79 passing through coating C and being scattered within the body of workpiece W in the direction toward the detector, as indicated by the broken arrow 81. The extent of the forward scattered radiation depends upon the nature and condition of the workpiece W adjacent the aperture 67a so that such forward scattered radiation, if allowed to reach the radiation detector, may detract from the accuracy and reproducibility of the thickness measurements. Accordingly, the mask member 76, in shielding radiation detector 14a from the forward scattered radiation, ensures that reliably accurate thickness measurements will be obtained.

Figure 10:
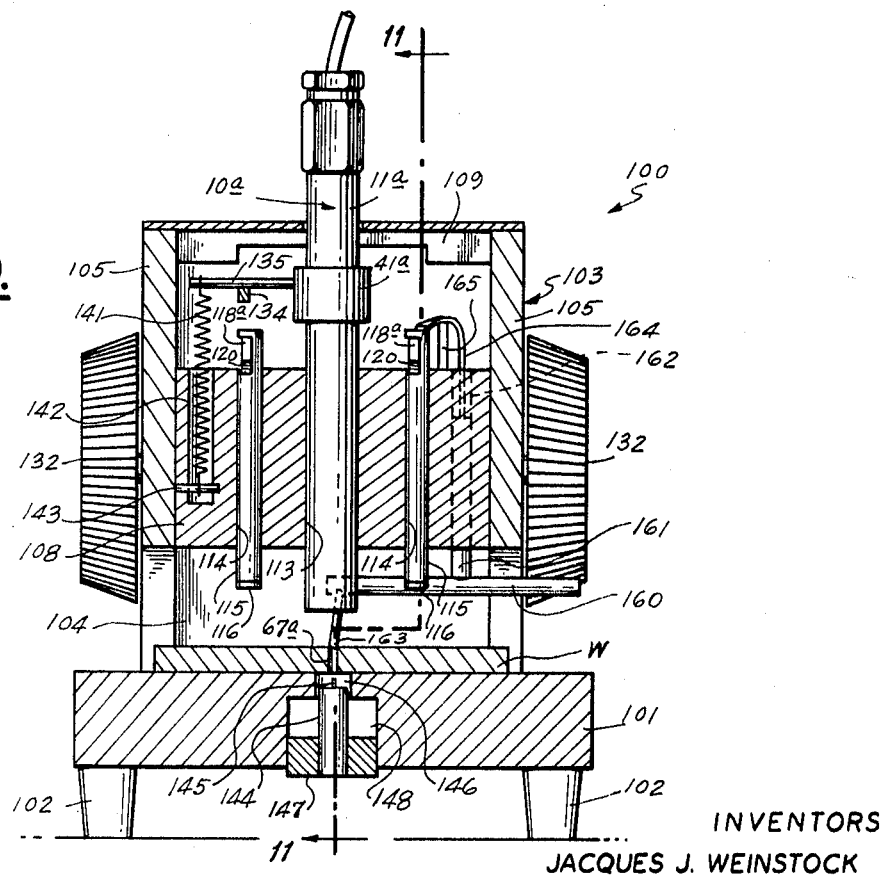
FIG. 10 is a transverse sectional view, taken along the line 10–10 on FIG. 11, and showing an apparatus according to a preferred embodiment of the invention.
Figure 11:
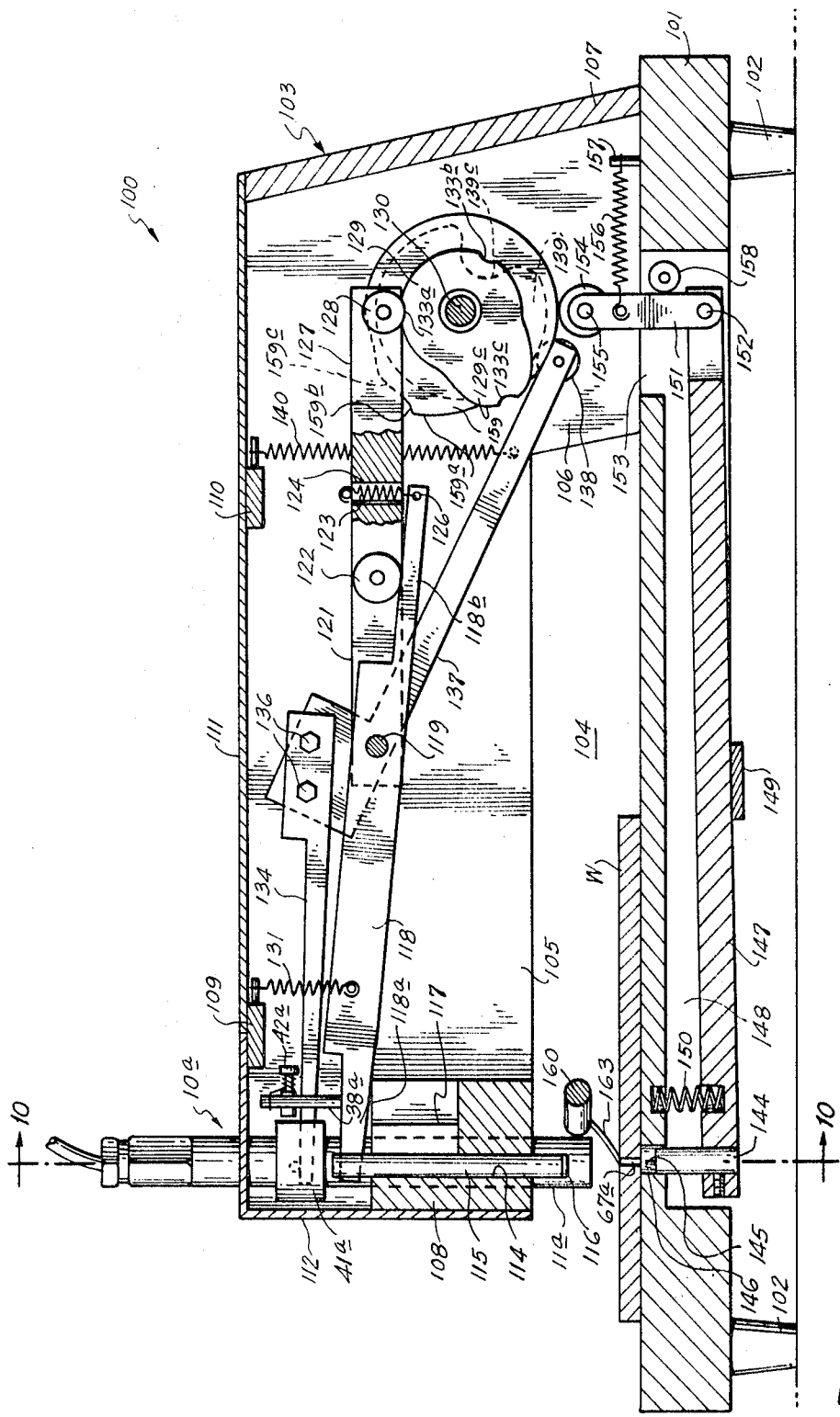
FIG. 11 is a longitudinal sectional view of the preferred apparatus taken along the line 11–11 on FIG. 10.
Figure 12:
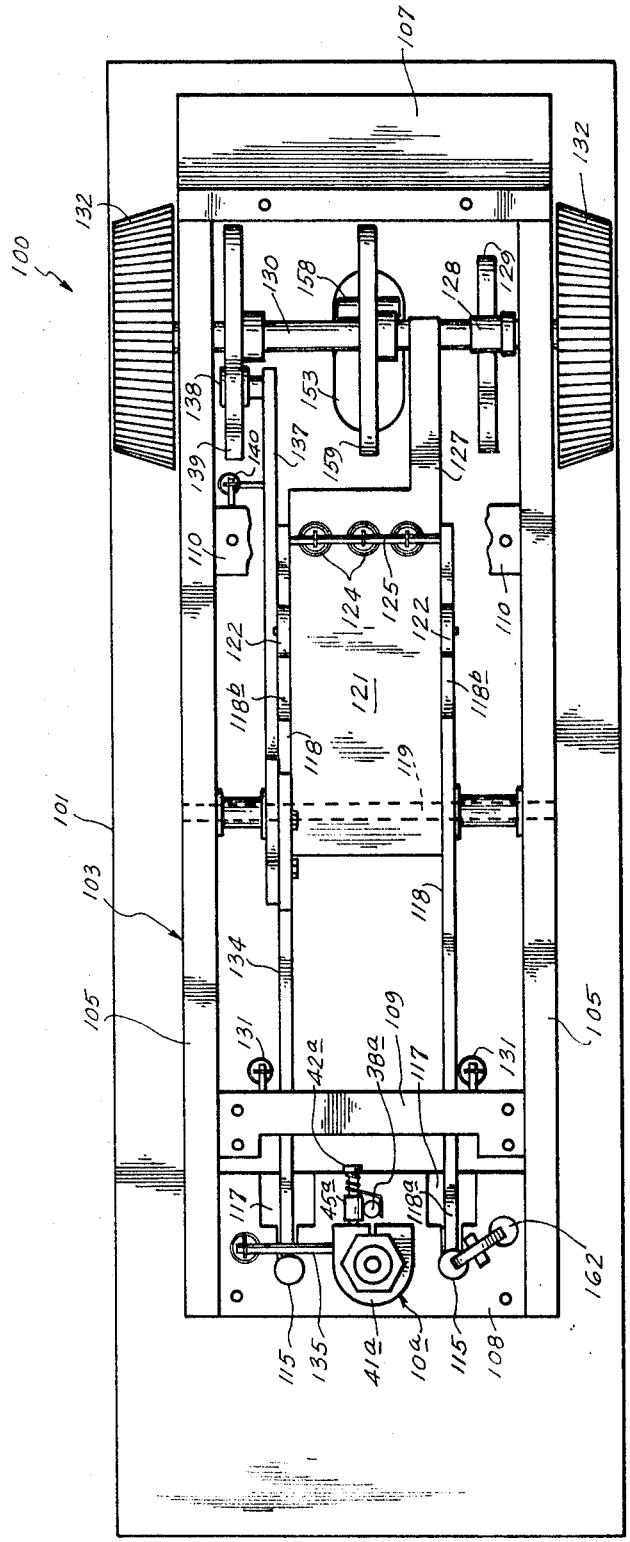
FIG. 12 is a top plan view of the apparatus of FIGS. 10 and 11 shown with its cover plates removed.

Referring now to FIGS. 10, 11 and 12, it will be seen that a beta backscatter-type measuring apparatus 100 according to a preferred embodiment of this invention comprises an elongated rectangular base 101 raised from a supporting surface on feet 102, and an elongated housing 103 which is mounted at its back end on base 101 and extends along the latter in raised relation to the base to define a space 104 therebetween opening at the sides and front of the apparatus.

The housing 103 is shown to include elongated sidewalls 105 having depending extensions 106 at their back ends (FIG. 11) by which such sidewalls are suitably mounted on base 101 in parallel, laterally spaced relation. A back end wall 107 (FIGS. 11 and 12) extends between the back end edges of sidewalls 105, and a guide body 108 extends between the front end portions of the sidewalls in elevated relation to base 101 (FIGS. 10 and 11). The sidewalls 105 are further joined by crossmembers 109 and 110 extending between their upper edges at locations spaced apart along the latter. Housing 103 may further have removable cover plates 111 and 112 (FIG. 11) to close the top and front end portions of the housing.

Guide body 108 is shown to have a laterally centered guide bore 113 (FIG. 10) extending vertically therethrough and slidably receiving the cylindrical casing 11a of a probe assembly 10a which is preferably of the type described above with reference to FIG. 9. Guide body 108 also has vertical bores 114 (FIGS. 10 and 11) extending therethrough at opposite sides of bore 113 to slidably receive rods 115 having rubber pads 116 at their lower ends for constituting clamping feet. Vertical slots 117 extend along the upper portions of bores 114 and open rearwardly and upwardly in guide block 108.

Vertical movements of rods 115 are controlled by levers 118 which are rockable, intermediate their ends, on a shaft 119 extending between sidewalls 105 and supported by the latter. Forward end portions 118a of levers 118 extend through slots 117 of guide block 108 and engage in recesses 120 (FIG. 10) cut in sides of the upper portion of rods 115 to connect the latter with levers 118. An elongated block 121 is pivoted on shaft 119 and extends rearwardly from that shaft between levers 118. Rollers 122 are rotatably mounted at the opposite sides of block 121 (FIGS. 11 and 12) to ride on rearward end portions 118b of the levers 118 at the respective sides. Tension springs 123 extend through bores 124 in block 121 and are anchored at their opposite ends to a rod 125 extending across the top of block 121 and to a rod 126 extending between rearward end portions 118b of levers 118, whereby levers 118 are yieldably urged relative to block 121 in the direction to engage rollers 122 with lever portions 118b.

Block 121 further has an arm 127 extending rearwardly therefrom adjacent one side and carrying a rotatable cam follower roller 128 which engages, from above, with a related cam 129 secured on a camshaft 130 journaled in the rear portions of sidewalls 105. Tension springs 131 extend upwardly from the forward end portions of levers 118 to the crossmember 109 to urge levers 118 and block 121 to rock together in the clockwise direction, as viewed on FIG. 11, whereby to lift rods 115 to their raised, inoperative positions, as shown, and to hold cam follower roller 128 in contact with the periphery of cam 129.

Camshaft 130 is manually rotatable, as by knobs 132 (FIGS. 10 and 12) secured to ends thereof projecting through sidewalls 105, and cam 129 may have notches 133a, 133b and 133c formed in its periphery at equally angularly spaced locations (FIG. 11) to cooperate with cam follower roller 128 in forming a detent to releasably hold shaft 130 in any selected one of three operating positions thereof, as hereinafter described. As shown on FIG. 11, cam 129 is of relatively small radius over the portions thereof having notches 133a and 133b therein and has a radially enlarged node 129c at the location of notch 133c. Thus, clamping feet 116 are raised, as shown, when shaft 130 is in a first position (as shown) in which roller 128 engages notch 133a or a second position in which roller 128 engages notch 133a or a second position in which roller 128 engages notch 133b. However, when shaft 130 is further turned to a third position, in which roller 128 engages notch 133c, node 129c of cam 129 raises roller 128 and hence rocks the assembly of block 121 and levers 118 in the counterclockwise direction, as viewed on FIG. 11, to move clamping feet 116 downwardly against a workpiece on base 101. When feet 116 have engaged the workpiece W, further rocking of block 121 by node 129c of cam 129 causes block 121 to rock relative to levers 118 against the force of springs 123 which thereby determine the clamping force exerted by feet 116 on the workpiece.

Turning of probe casing 11a in bore 113 may be prevented by providing such bore and the casing with noncircular cross sections or, as in the previously described embodiment, by an upright rod 38a staked solidly in guide body 108 parallel to bore 113 (FIG. 11) and engaged at one side by a roller 45a on a pin 42a extending rearwardly from a clamping collar 41a secured on probe casing 11a. A torsion spring 43a on pin 42a has one end secured to the latter and its other bent end bears on the side of rod 38a remote from roller 45a to hold the latter against rod 38a. Thus, probe assembly 10a is free to move vertically in bore 113 while being held against rotation in the latter.

The vertical movements of probe assembly 10a are controlled by an arm 134 engaging, at its forward end, under a pin 135 directed laterally from collar 41a, and which is secured, as at 136 (FIG. 11), to a lever 137 rockable on shaft 119. The rearward end of lever 137 carries rotatable cam follower roller 138 engageable from below with the periphery of a cam 139 (shown in broken lines on FIG. 11) which is also fixed on camshaft 130. A tension spring 140 is connected at its lower end to lever 137 and at its upper end to crossmember 110 to urge lever 137 and the arm 134 rigid therewith to rock in the counterclockwise direction, as viewed on FIG. 11, for holding cam follower roller 138 against cam 139. A tension spring 141 (FIG. 10) is connected at its upper end to pin 135 and extends into a bore 142 in guide body 108 for connection at its lower end to a pin 143 in bore 142. Thus, spring 141 urges probe assembly 10a downwardly to engage the lower end of its casing 11a with a workpiece W on base 101.

As shown on FIG. 11, the peripheral portions of cam 139 which engage roller 138 when camshaft 130 is in its first and second positions, that is, when roller 128 engages notch 133a or notch 133b, are of relatively large radius, whereby arm 134 acts upwardly against pin 135 to hold probe assembly in its raised or inoperative position, as shown, against the force of spring 141. However, the portion 139c of cam 139 which engages cam follower roller 138 in the third position of camshaft 130, that is, when roller 128 engages notch 133c, is of reduced radial extent so that lever 137 and arm 134 are rocked in the counterclockwise direction to lower the forward end of arm 134 and thereby permit spring 141 to move probe assembly 10a downwardly into contact with a workpiece W on base 101.

In order to locate an aperture 67a in the workpiece with respect to probe assembly 10a, apparatus 100 has locating pin 144 (FIGS. 10 and 11) formed with a reduced diameter extension 145 at the top and being loosely received in a bore 146 in base 101 under probe assembly 10a. The pin 144 extends upwardly from the forward end of a rock lever 147 which is received in a laterally centered groove 148 extending longitudinally in the bottom surface of base 101, and which is rockable, and also longitudinally movable on a fulcrum bar 149 extending across the bottom of groove 148 intermediate the ends of lever 147.

A compression spring 150 is interposed between the top of groove 148 and the forward portion of lever 147 to urge the latter to rock in the direction for retracting pin 144 and its extension 145 within bore 146 (as shown on FIG. 11). The back end of lever 147 has a pair of upwardly directed links 151 pivotally connected thereto, as at 152. Links 151 extend upwardly through a slot 153 opening at the top surface of base 101 from groove 148. A cam follower roller 154 is rotatable on an axle 155 carried by the upper ends of links 151 and a tension spring 156 extends rearwardly from links 151 to an anchor pin 157 extending from base 101 for holding the back edges of links 151 against rollers 158 which extend laterally across slot 153. It will be seen that rollers 158 engage links 151 intermediate the point of attachment of spring 156 to the links and the pivot 152 connecting the links to lever 147. Thus, the rearwardly directed force of spring 156 tends to rock links 151 in the clockwise direction, as viewed on FIG. 11, about the rollers 158, and thereby urges lever 147 longitudinally forward to cause pin 144 to rest against the front surface of bore 146 in which it is loosely received.

Cam follower roller 154 is engageable from below with the periphery of a cam 159 fixed on camshaft 130 between cams 129 and 139. The periphery of cam 159 is selected so that portions of relatively small radial extent engage roller 154, thereby to permit rocking of lever 147 by spring 150 for retracting pin within bore 146, when camshaft 130 is in its first and third positions, that is, when roller 128 engages one or the other of notches 133a and 133c. However, as camshaft 130 is moved to its second position at which roller 128 engages in notch 133b, roller 154 is engaged by a peripheral portion 159a of cam 159 which is of increased radial extent to rock lever 147 in the clockwise direction for raising pin 144 and causing its slender extension 145 to project from bore 146 above the upper surface of base 101. When camshaft 130 arrives in its second position, at which it is held by engagement of roller 128 in notch 133b, a short inclined peripheral portion 159b of cam 159 engages roller 154 which is pressed upwardly thereagainst by the action of spring 150. Such upward urging of roller 154 causes the latter to roll slightly on inclined peripheral portion 159b of the cam and, in doing so, effects slight counterclockwise rocking of links 151 about rollers 158, whereby lever 147 is displaced rearwardly and pin 144 is drawn against the back surface of bore 146. Upon such rearward displacement of lever 147, roller 154 comes to rest against a peripheral portion 158c of cam 159 which immediately follows inclined portion 159b and is of sufficiently large radial extent to cause the slender extension 145 of pin 144 to continue to project above the top surface of base 101.

As camshaft 130 is moved away from its second position, inclined peripheral portion 159b of cam 159 moves away from roller 154 while the latter rides on cam portion 159c so that spring 156 can rock links 151 about rollers 158 in the direction to forwardly displace pin 144 in bore 146. Following such initial forward displacement of pin 144, continued movement of camshaft 130 away from its second position causes roller 154 to ride off cam portion 159c so that, with pin 144 pressed against the front of bore 146, pin 144 is again retracted into bore 146 prior to arrival of camshaft 130 at its third position in which roller 128 engages in notch 133c.

In order to roughly position a selected aperture 67a of a workpiece W at the measuring station on base 101, whereby to receive the extension 145 of pin 144 for precise locating of such aperture relative to the probe assembly, apparatus 100 further comprises an index device including a horizontal arm 160 (FIGS. 10 and 11) mounted, intermediate its ends, on the lower end of a rod 161 which projects downwardly from a vertical bore 162 (FIG. 12) formed in guide body 108. The bore 162 is disposed outwardly with respect to one of the bores 114 and slightly to the rear thereof, and has the rod 161 both turnable and vertically movable therein. A downwardly and forwardly inclined positioning pin 163 (FIGS. 10 and 11) extends from one end of arm 161 and is dimensioned and shaped so that the end of pin 163 is disposed approximately at the measuring station when the end of arm 161 from which pin 163 extends is engaged against the back of casing 11a of probe assembly 10a, as shown on FIGS. 10 and 11. The end portion of arm 161 remote from pin 163 projects laterally beyond housing 103 to constitute a handle by which arm 161 can be turned and raised or lowered.

In order to ensure that pin 163 will not interfere with the downward movement of probe assembly 10a to its measuring position in contact with a workpiece, a flexible strap or cable 164 (FIGS. 10 and 12) is secured at one end to the upper end of rod 161 and extends upwardly from bore 162 over a bridge 165 to a point of attachment at the upper end of the adjacent clamping foot rod 115. Thus, when rods 115 are moved downwardly to engage clamping feet 116 with a workpiece, strap 164 pulls rod 161 upwardly in bore 162 and inclined pin 163 rides against the lower edge of probe casing 11a to be out of the way of the latter as the probe assembly moves downwardly immediately after the clamping feet 116.

The apparatus 100 operates as follows:

Initially, camshaft 130 is disposed in its first position, as shown on FIG. 11, so that probe assembly 10a and clamping feet 116 are raised and locating pin 144 is retracted to permit a workpiece W to be disposed on base 101. The arm 160 is then manipulated so that the end of pin 163 lies on the upper surface of the workpiece and the arm 160 engages against the back surface of probe casing 11a. With the pin 163 thus located relative to the probe assembly, workpiece W is shifted on base 101 until the aperture 67a in which a coating is to be measured is engaged by the end of pin 163 and thereby roughly positioned at the measuring station.

With the selected aperture 67a roughly positioned at the measuring station, camshaft 130 is turned in the counterclockwise direction as viewed on FIG. 11 through 120° to its second position, whereby locating pin 144 is raised to project its slender extension 145 into aperture 67a and is further displaced rearwardly against the back surface of bore 146. Then, workpiece W is drawn lightly forward to engage pin extension 145 against the back surface of aperture 67a, whereby to accurately locate a coating on the back surface of aperture 67a with respect to the probe assembly 10a.

Having thus accurately located the coating to be measured relative to the probe assembly, camshaft 130 is further turned in the counterclockwise direction through 120° to its third position. During such turning of shaft 130, pin extension 145 is retracted downwardly from aperture 67a, after having been first displaced forwardly away from the coating to be measured, as previously described, so that the downward retraction of pin extension 145 cannot mar or damage the thin coating to be measured. Turning of shaft 130 to its third position further causes downward movement of feet 116 into clamping engagement with workpiece W for holding the latter with the coating to be measured in its aperture 67a accurately located relative to the probe assembly, and also causes downward movement of probe assembly 10a to its measuring position in contact with the workpiece. Thereupon, measurement of the coating thickness is effected.

Following the measurement of the coating thickness, camshaft 130 is turned through 120° in the counterclockwise direction for return to its first position at which feet 116 and probe assembly 10a are again raised to permit removal of workpiece W from base 101.

It will be apparent from the above that the apparatus 100 according to this invention is successively conditioned for the various steps involved in the accurate measurement of coating thicknesses merely by the step-by-step turning of camshaft 130 so that the apparatus is easily operated, even by relatively unskilled personnel.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. Apparatus for measuring the thickness of coatings on the sidewalls of apertures in printed circuit board workpieces and the like by beta ray backscatter techniques comprising
   a workpiece-supporting surface having a measurement station located thereon,
   means for mounting a beta ray probe assembly in predetermined positional disposition relative to said measurement station to fixedly locate the path of beta ray emission therefrom relative thereto,
   means included in said mounting means permitting displacement of said probe assembly along a predetermined path toward and away from said measurement station,
   displaceable locating means insertable into a selected aperture in said workpiece for selectively locating a sidewall area thereof whose coating thickness is to be measured in predetermined relation to said measurement station,
   and clamping means to clamp said selectively positioned workpiece relative to said workpiece-supporting surface to fixedly locate said area to be measured relative to said probe assembly and the path of beta ray emission therefrom.

2. Apparatus according to claim 1 including an elongated probe assembly comprising a tubular member having an exposure opening at one end,
   a beta radiation detector and a holder for an isotope source of beta radiation positioned within said tubular member in predetermined relationship with said opening,
   said holder shaped to define a beta radiation emitting opening disposed substantially coplanar with said exposure opening and positioned in predetermined angular relation to the plane of said opening to selectively direct emission therefrom onto said area of the sidewall of a selected aperture while said probe assembly is disposed at said measurement station.

3. An apparatus according to claim 1, said means for permitting selective displacement of said probe assembly relative to said mounting means comprising guide means mounted in fixed relation to said measurement station for slidably engaging a probe assembly to guide the probe assembly along said predetermined path.

4. An apparatus according to claim 1, said insertable locating means comprising a pin at said measurement station slidable in a guide fixed relative to said mounting means,
   and manipulative means to move␣an end of said pin into and out of an aperture of a workpiece on said workpiece-supporting surface.

5. An apparatus according to claim 1, said clamping means comprising a lever mounted on a pivot fixed relative to said mounting means,
and adjustable means for clamping said lever against a workpiece on said workpiece-supporting surface.

6. An apparatus according to claim 1, including an index member for indicating an aperture roughly positioned at said measurement station.

7. An apparatus according to claim 1, including spring means for pressing a probe assembly against a workpiece on said workpiece-supporting surface.

8. An apparatus according to claim 1, said mounting means including means for preventing a probe assembly from turning in a plane lateral to said predetermined path of movement of said probe assembly.

9. An apparatus according to claim 8, said turn-preventing means including a bar rigidly supported on said mounting means parallel to said predetermined path,
a clamping collar for seizing upon a probe assembly,
a pin extending from said collar,
a torsion spring mounted on said pin and having one end anchored thereon,
said spring having a portion thereof pressing against the side of said bar located opposite from said pin.

10. An apparatus according to claim 1, said mounting means including a collar clamped to said probe assembly,
resilient means attached to said collar for biasing said probe assembly toward said workpiece-supporting surface,
a bar upstanding from said mounting means, and
means supported on said bar for raising said probe assembly away from said workpiece-supporting surface.

11. Apparatus according to claim 10, said means for raising said probe assembly comprising a rotatable member carrying a crankpin, and means connected to said crankpin and to said collar whereby to raise said probe assembly upon rotation of said rotatable member.

12. An apparatus according to claim 1, including an elongated probe assembly comprising a tubular casing, a holder for an isotope source of beta radiation disposed within said casing at one end of the latter, said holder having a bore in which said isotope source is recessed and a beta radiation emitting opening from said bore disposed substantially coplanar with the plane of the edge of said casing at said one end of the latter, said bore being positioned in predetermined angular relation to said plane of the casing edge to selectively direct a collimated beam of beta radiation from said end of the casing onto said area of the sidewall of a selected aperture while said probe assembly is disposed at said measurement station, a beta radiation detector disposed in said casing adjacent said one end and having a window facing the latter for receiving, and being activated by radiation backscatter from the coating whose thickness is to be measured, and means at said one end of the casing defining an exposure opening within which said source holder is located.

13. An apparatus according to claim 12, in which said means defining the exposure opening consists of a mask member through which said exposure opening extends, said mask member having an outer surface at which said exposure opening is of relatively small area and an inner surface at which said exposure opening is of relatively large area so that said mask member shields said detector from forward scattered radiation and avoids interference with backscattered radiation.

14. An apparatus according to claim 1, further comprising first actuating means for said probe assembly to selectively dispose the latter at a rest position remote from said workpiece-supporting surface and at an operative position against a workpiece on said surface, second actuating means for said locating means to selectively dispose the latter at a rest position retracted relative to said supporting surface and at an operative position projecting beyond said surface, third actuating means for said clamping means to selectively dispose the latter at a rest position remote from said workpiece-supporting surface and at an operative position bearing against a workpiece on said surface, and a single manually displaceable control means for said first, second and third actuating means to effect selective positioning of said probe assembly, locating means and clamping means at said rest and operative positions in a predetermined sequence.

15. An apparatus according to claim 14, in which said control means is displaceable to first, second and third positions in sequence at which, respectively, said probe assembly, locating means and clamping means are all at said rest positions thereof, said probe assembly and clamping means remain at said rest positions thereof and said locating means is displaced to its operative position, and said probe assembly and clamping means are displaced to their operative positions and said locating means is returned to its said rest position.

16. An apparatus according to claim 15, further comprising an index member movable to an operative position in said path of displacement of the probe assembly to roughly position a selected aperture of a workpiece at said measurement station.

17. An apparatus according to claim 16, further comprising means to withdraw said index member out of said path upon displacement of said control means to said third position thereof.

18. An apparatus according to claim 15, in which said first, second and third actuating means respectively include first, second and third cams, and said control means includes a rotatable camshaft having said first, second and third cams fixed thereon.

19. An apparatus according to claim 15, in which said locating means includes a pin loosely slidable in a bore opening at said workpiece-supporting surface, said second actuating means urges said pin against a side surface of said bore when in said operative position and effects diametrical displacement of said pin away from said side surface of the bore prior to said return to its rest position in response to displacement of said control means to said third position thereof.

20. An apparatus according to claim 1, in which said means permitting displacement of said probe assembly includes a guide member having a bore therein in the direction of said predetermined path and in which said probe assembly is longitudinally slidable, and said means to clamp the selectively positioned workpiece includes elongated rods extending parallel to said bore receiving the probe assembly at opposite sides of the latter and being longitudinally slidable in said guide member, said rods having clamping feet at the ends thereof extending toward said workpiece-supporting surface.

21. In apparatus for measuring the thickness of coatings on the sidewalls of apertures in printed circuit board workpieces and the like by beta ray backscatter techniques,
a probe assembly including an elongated tubular casing having a dependent open end,
a mask member defining a relatively small exposure opening mounted in the open end of said casing,
a beta radiation detector mounted within said casing in abutting relation with the upper surface of said mask member,
a holder for an isotope source of beta radiation disposed within said casing,
said holder being shaped to define a bore dependently terminating in a beta radiation emitting opening disposed within said relatively small exposure opening in said mask member and positioned to selectively direct collimated beta radiation exteriorly of said probe assembly casing at a predetermined angle relative to the longitudinal axis thereof,
whereby said mask member shields said beta radiation detector from forward scattered beta radiation while avoiding interference with the reception of backscattered radiation by said detector.

22. An apparatus as set forth in claim 21,
wherein said mask member is shaped to define an aperture dependently terminating in said exposure opening at the other surface thereof and said aperture being countersunk at the inner surface of said mask member so that said exposure opening can be of small area to cause said mask member to shield said detector from forward scattered radiation while avoiding interference with the reception of backscattered radiation by said detector.